C. DURNING.
AUTOMOBILE SIGNAL.
APPLICATION FILED SEPT. 26, 1919.

1,397,947.

Patented Nov. 22, 1921.
3 SHEETS—SHEET 1.

Inventor
Charles Durning

By W. W. Williamson
Atty.

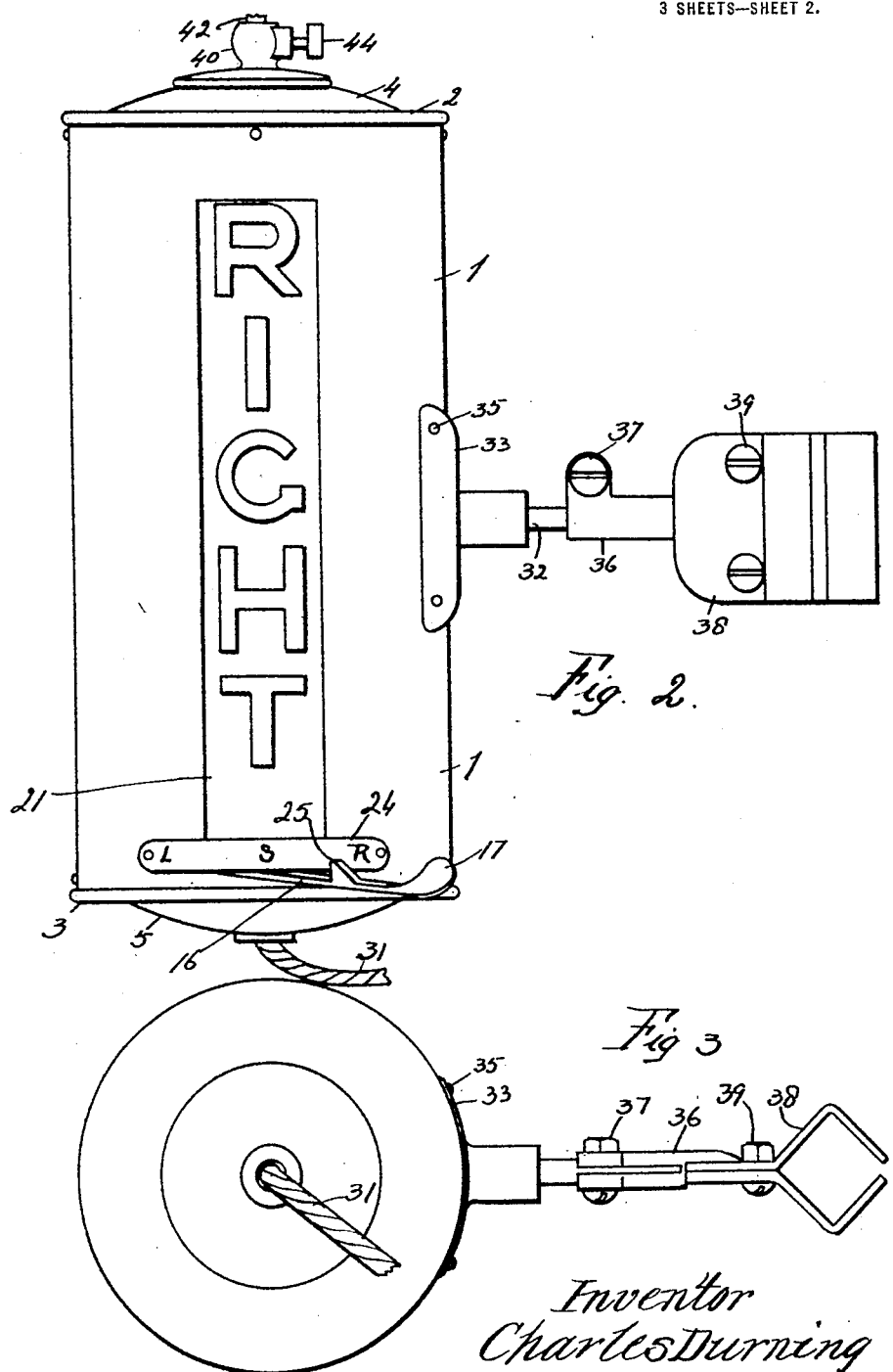

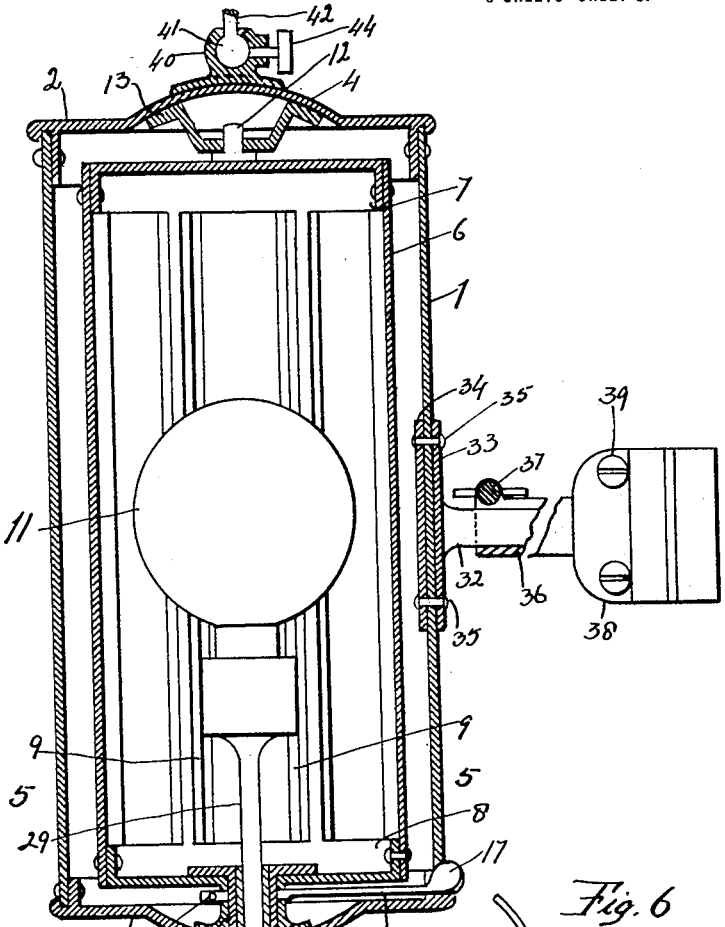
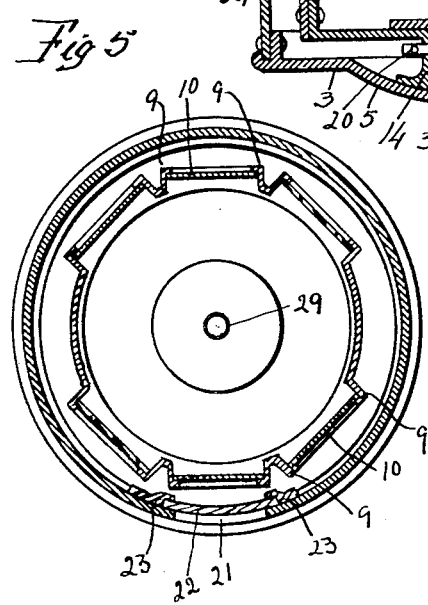
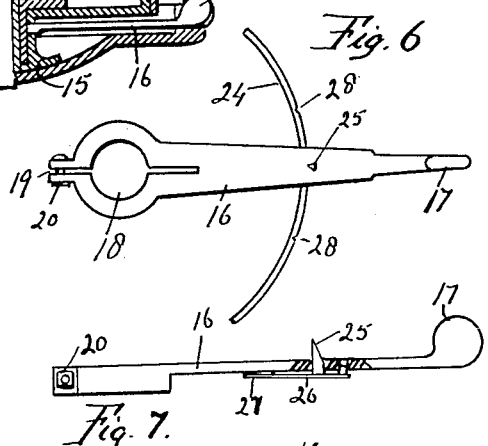

UNITED STATES PATENT OFFICE.

CHARLES DURNING, OF PHILADELPHIA, PENNSYLVANIA.

AUTOMOBILE-SIGNAL.

1,397,947. Specification of Letters Patent. Patented Nov. 22, 1921.

Application filed September 26, 1919. Serial No. 326,549.

*To all whom it may concern:*

Be it known that I, CHARLES DURNING, a citizen of the United States, residing at Philadelphia, in the county of Philadelphia and State of Pennsylvania, have invented new and useful Improvements in Automobile-Signals, of which the following is a specification.

My invention relates to a new and useful improvement in automobile signals and mirrors therefor, and has for its object to provide an exceedingly simple and effective device of this description which may be readily attached to some convenient portion of the automobile such as the wind shield frame and when so attached may be adjusted at different distances from the side of the machine and at any desired angle.

A further object of my invention is to also provide for the adjustment of the observation mirror so that it may be set at the proper angle to permit the driver to observe objects in the rear.

A still further object of my invention is to so construct a signal drum as to permit the ready removal and replacement of different signals, and A still further object of my invention is to so construct the device that the driver may readily set the signals.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 2, is an enlarged elevation of the signal.

Fig. 3, is a plan view of Fig. 2.

Fig. 4, is a central vertical section.

Fig. 5, is a section at the line 5—5 of Fig. 4.

Fig. 6, is a plan view of the operating lever showing a dial in proper relation thereto.

Fig. 7, is an edge view of Fig. 6 the dial being omitted and a portion of the operating lever broken and sectioned to clearly show the arrangement of the locking pointer.

Figure 1:
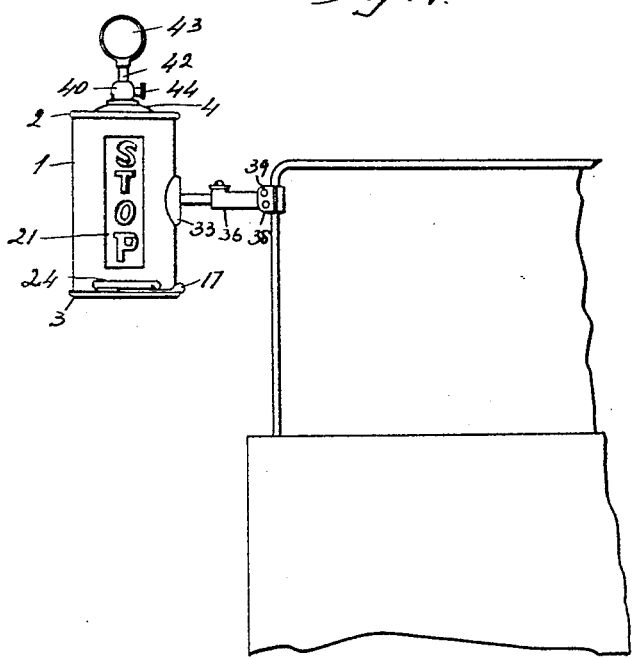
Figure 1, is an elevation of the signal showing it attached to the wind shield of an automobile.

In carrying out my invention as here embodied, 1 represents the casing which is preferably in the form of a cylinder having the heads 2 and 3 secured in the ends thereof the head 2 having the central portion thereof formed in the shape of a portion of a sphere as indicated at 4 and the lower head 3 has its central portion likewise formed as indicated at 5.

6 represents the signal drum having the heads 7 and 8 secured in the ends thereof and this drum is provided with the flanges 9 formed from the side walls thereof, said flanges being adapted to guide and hold the signals 10 in place as clearly shown in Fig. 5. These signals consist of strips of metal or other suitable material having the indicating letters or figures cut therethrough after the manner of a stencil in order that the light emanating from the lamp 11 may pass through and cause these letters or figures to stand out prominently at night the letters being readily legible by day without light.

12 represents a stud or turn pin carried by the upper head 7 of the drum and this pin projects through a hole through the bridge 13 so as to journal an upper end of the drum in order that it may revolve freely within the casing 1, the bridge being secured to the spherical portion of the head 2 as clearly shown in Fig. 4.

In order that the lower end of the drum may also be properly journaled a flanged sleeve 14 is secured to the head 8 and this sleeve projects into the socket 15 secured in the spherical section of the head 3. This arrangement permits the signal drum to be freely revolved in either direction.

16 represents an operating lever which terminates in the thumb piece 17 and the hub 18 of this operating lever has a hole therethrough adapting it to fit upon the sleeve 14 and this hub is split as indicated at 19 in order that it may be clamped upon the sleeve by the bolt 20. This arrangement permits the adjusting of the signal barrel relative to the operating lever so as to bring the signals in proper relation to the opening 21 in the casing 1, and said opening is preferably covered with a transparent strip 22 such as glass held in the guideways 23.

24 represents a dial or indicating strip which is secured to the outer surface of the casing near the bottom thereof and has thereon the proper indicating letters and numbers such as L for left, R for right and S for stop which correspond with the letters and numbers upon the signals therewith when the pointer 25 is brought into register with one of these letters corresponding the signal will appear through the opening 21 in the casing. In order that the signal drum may be locked in any adjustment against displacement the pointer 25 is mounted upon a spring 26 which latter is secured at 27 to the operating lever 16 and this pointer has a relatively sharp edge adapted to latch into the notches 28 formed in the face of the dial 24 so that when the operating lever is moved to the position to display the proper signal the pointer will latch into one of the notches and hold the signal drum in this position until sufficient pressure has been put upon the operating lever to force the pointer out of engagement with the notch as will be readily understood.

The lamp 11 is supported upon a shank 29 which passes down through the sleeve 14 and is secured in the head 3 by the screw threads 30. Through this shank run the usual electric cord 31 which carry the feed wires to the lamp.

Secured to the casing 1 is a bracket shank 32, said shank having a flared base 33 which conforms to the contour of the outer surface of the casing a shoe 34 corresponding in shape to the base 33 being placed upon the inside of the casing, both the base and shoe rigidly secured upon the casing by the rivets 35 thus making a rigid and durable anchorage for the bracket shank.

36 represents a socket into which the bracket shank 32 is adapted to fit and this socket is split in order that the thumb bolt 37 may clamp the socket tightly upon the bracket shank when the signal has been set in the desired position. By this arrangement the signal may be adjusted in or out relative to the automobile upon which the socket is secured and may be turned at any desired angle by pushing the bracket shank in its socket.

38 represents the clamp which is either formed with or secured to the socket 36 and consists of two members secured together by the thumb bolts 39 and serves to attach the socket to the wind shield formed frame of an automobile or any other part of such machines.

Secured to the top of the spherical section 4 is a universal socket 40 in which fits a ball 41 so as to produce a ball socket joint and this ball has a stem 42 projecting upward therefrom which carries an observation mirror 43 by means of the thumb screw 44, this mirror may be set at any angle or in any desired position within the limitations of the ball socket joint as will be readily understood.

From the foregoing description it will be seen that an exceedingly simple, cheap and effective signal is produced which may be readily attached to an automobile and adjusted to the proper position for easy observation from the rear of the machine and also that an observation mirror is so located upon the device that it may be adjusted to give the proper view rearward of the machine to the driver.

Of course I do not wish to be limited to the exact details of construction as herein shown as these may be varied within the limits of the appended claims without departing from the spirit of my invention.

Having thus fully described my invention, what I claim as new and useful is:—

1. An automobile signal comprising a cylindrical casing having a sight opening therein, a transparent strip disposed across said opening, a head secured in each end of said casing, each head having a spherical section formed therewith and projecting outwardly, a bearing socket secured within the lower spherical section, a bridge secured within the upper spherical section, a signal barrel within the casing, flanges formed from the body of the signal barrel, signal strips or members held by said flanges, a flanged sleeve carried by the lower end of the signal barrel and journaled in the bearing socket, a stud carried by the upper end of the signal barrel and journaled in the bridge, whereby the signal barrel will be rotatable, means for rotating said signal barrel and a lamp support, the standard of which projects through the flanged sleeve and is threaded in the lower spherical section, as shown.

2. An automobile signal comprising a casing adjustable horizontally and vertically and adapted to remain in a fixed position, a signaling member within said casing, a socket carried by the upper end of said casing, an adjustable observation mirror support including a standard and integral ball, said ball being located in said socket for universal adjustment and means for holding said ball in a fixed position.

3. An automobile signal comprising a cylindrical casing, a head secured in each end of said casing, each head having an integral spherical section projecting outwardly, a bearing socket within the lower spherical section, a bridge within the upper spherical section, a signal barrel within the casing, a flanged sleeve carried by the lower end of the signal barrel and journaled in the bearing socket, a stud carried by the upper end of the signal barrel and journaled in the bridge, a lamp support provided with a standard projecting through the flanged sleeve and having threaded connection with the lower spherical section.

In testimony whereof, I have hereunto affixed my signature.

CHARLES DURNING.